May 26, 1970 K. H. SENNOWITZ 3,513,837

ELECTRICAL DISCHARGE MACHINING POWER SUPPLY CIRCUIT

Filed March 28, 1967

INVENTOR.

Kurt H. Sennowitz

BY

Harry R Dumont

ATTORNEY.

United States Patent Office 3,513,837
Patented May 26, 1970

3,513,837
ELECTRICAL DISCHARGE MACHINING POWER SUPPLY CIRCUIT

Kurt H. Sennowitz, Royal Oak, Mich., assignor, by mesne assignments, to Elox Inc., Troy, Mich., a corporation of Delaware Filed Mar. 28, 1967, Ser. No. 626,570
Int. Cl. B23p 1/08
U.S. Cl. 219—69 12 Claims

ABSTRACT OF THE DISCLOSURE

A circuit for providing machining power pulses from a DC source to an EDM gap and employing a controlled rectifier supplying periodic gap-shunting turn-off spikes to the gap. A second controlled rectifier is used for turn-off of the first controlled rectifier. Turn-on and turn-off are precisely controlled by a multivibrator pulse source alternately triggering-on each controlled rectifier.

BACKGROUND OF THE INVENTION

The field to which my invention relates is that known as electrical discharge machining in which material is removed from an electrically conductive workpiece by the action of electrical gap discharges between a tool electrode and the workpiece. An electrode servo feed system is employed to maintain an optimum gap spacing between electrode and workpiece as metal removal progresses. A dielectric coolant is circulated continuously through the gap during machining operation.

I have found that for low electrode wear machining, which may be achieved with certain electrode materials, it is required that high current, relatively long on-time pulses be employed in connection with a gap polarity whereby the electrode is positive and the workpiece negative.

SUMMARY OF THE INVENTION

My invention provides for the use of a pulsed, semiconductor controlled rectifier operatively connected across the machining gap to provide short duration power supply turnoff spikes by periodically shunting or turning off the gap in the conductive state of the controlled rectifier. A further feature of my invention is the use of a second controlled rectifier and turn-off network for precise control of turn-off of the first controlled rectifier. Turn-on and turn-off are precisely controlled by a multivibrator pulse source.

DESCRIPTION

Figure 1:
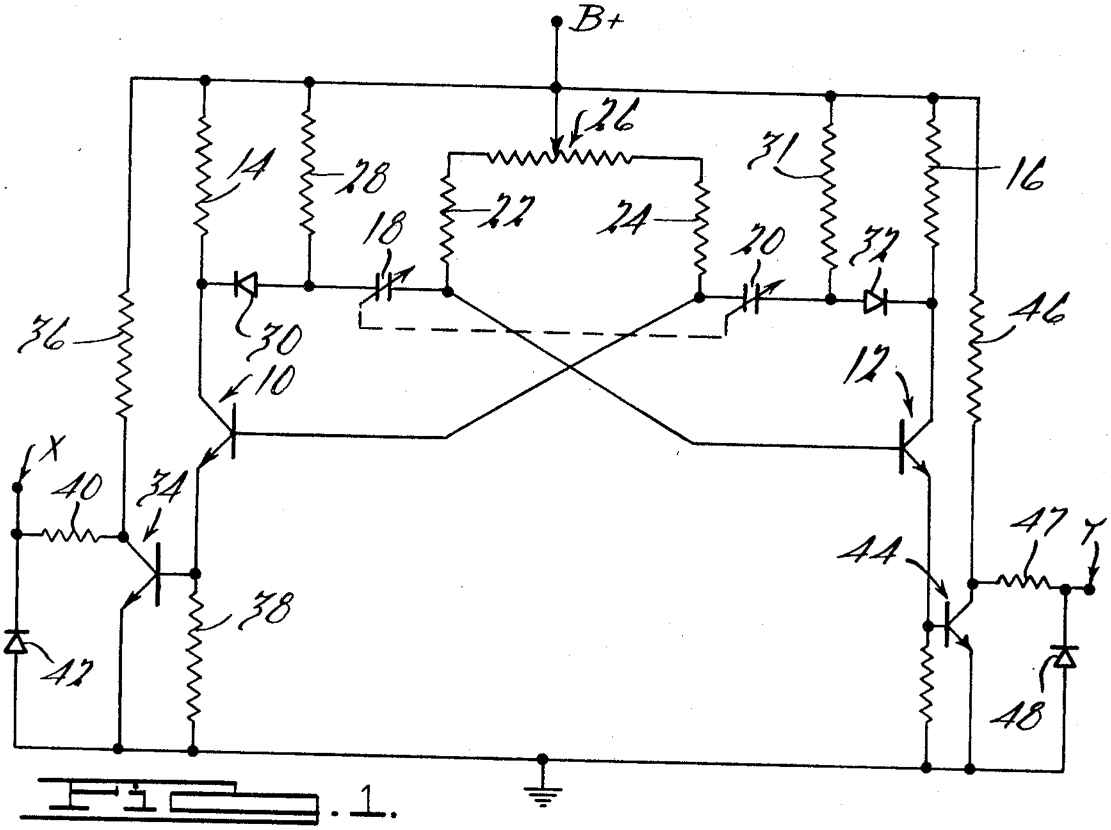
FIG. 1 is a schematic of the pulsing means for the controlled rectifiers embodied as an astable multivibrator.

Referring now to the drawing of FIG. 1, an astable multivibrator is shown which is particularly suitable as a pulse source in conjunction with my machining circuit. NPN transistors 10 and 12 are the switching transistors with emitter bias furnished from a B+ voltage source through resistors 14, 16, respectively. Cross coupling is through the networks including variable capacitors 18, 20 which may be selectively adjusted to control pulse output frequency. Fixed resistors 22, 24 and the variable resistance of potentiometer 26 are included to control base return and pulse on-off time. Frequency and pulse on-off ratio may be varied one independently of the other. Also included in the circuit are the diode-resistor networks comprising resistor 28, diode 30 and resistor 31, diode 32 for aiding in the provision of a true square wave output. Transistor 34 is connected to load resistor 36 and resistor 38 as shown and is directly driven by the output of transistor 10 to provide maximum pulse output power through resistor 40 to terminal X. Diode 42 is included to clip excessive negative spikes from the gate to cathode of that triggered silicon controlled rectifier which is coupled to terminal X. Similarly, transistor 44 is connected to the B+ voltage source through resistor 46 and driven directly by the output of transistor 12. The amplified output of transistor 44 is connected through resistor 47 to the terminal Y. Diode 48 is connected to clip excessive spikes from the gate to cathode of the triggered controlled rectifiers which are connected to terminal Y.

Figure 2:
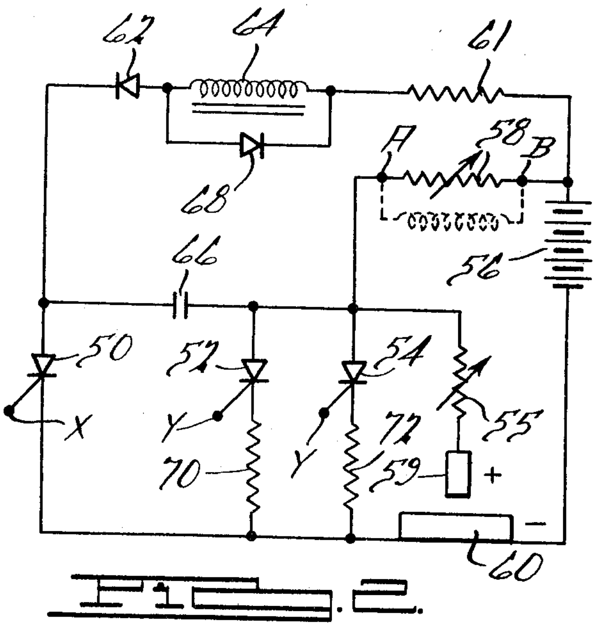
FIG. 2 is a schematic of one form of my invention.

FIG. 2 shows one form of my invention operable in conjunction with the multivibrator of FIG. 1. The X, Y triggering input terminals for the controlled rectifiers conform to those shown in FIG. 1. Controlled rectifiers 50, 52 and 54 are connected as shown. A power supply 56 is connected across the machining gap comprising electrode 59 and workpiece 60 with a polarity as shown. Resistor 58 is connected between power supply 56 and the anode of controlled rectifiers 52, 54 to limit current flow therethrough. An inductor may be substituted for resistor 58 between terminals A, B as shown in the drawing by dash line. This will provide improved gap turn-off and permit the use of a reduced value for current control resistor 55. Resistor 61 limits the current flow through controlled rectifier 50. A network including diode 62 and inductor 64 is connected in series with the anode of controlled rectifier 50. Diode 62 performs the function of a hold-off diode to allow commutating capacitor 66 to charge to a voltage higher than source 56 through inductor 64 and resistor 61. Inductor 64 is required for relatively high frequency operation of the circuit. A diode 68 is connected with a phasing as shown to clip negative going fly back spikes. Series equalizing resistors 70, 72 are connected as shown. As many as ten parallel connected controlled rectifiers may be connected in place of the two shown depending on the magnitude of cutting current desired.

In the operation of the circuit of FIG. 2, the controlled rectifiers are triggered into conduction by positive output pulses from the multivibrator. The gating electrode of controlled rectifier 50 is triggered by the output of transistor 34 while the gating electrodes of controlled rectifiers 52, 54 are triggered by the output of transistor 44. A machining power pulse is provided to the gap when controlled rectifiers 52, 54 are turned off. The gap is turned off when controlled rectifiers 52, 54 are turned on. I have found that where machining power pulses are controlled by shunt switching, the use of an electronic triggering device is highly advantageous. A sharp voltage drop is required to turn off the gap once gap ionization has occurred. Electronic triggering devices satisfy this requirement. By "electronic triggering device" I mean an electronic device having at least a pair of principal electrodes and a gating or control electrode, which device is triggered into conduction by application of a pulse of the appropriate polarity to its control electrode. The electronic triggering device is further characterized as one which when triggered into conduction remains conducting until the voltage at one of its principal electrodes is reversed in polarity or interrupted. Examples of electronic triggering devices are thyratrons, silicon controlled rectifiers and ignitrons.

The machining pulse on-time may be regulated by the setting of the multivibrator of FIG. 1, i.e., by the adjustment of potentiometer 26. Frequencies may be preselected by the magnitude of capacitors 18 and 20.

Tapped capacitor switches may be employed where a number of frequency settings are desired. It is possible to operate the circuit of FIG. 2 with precisely controlled machining pulse on-time ranging from 30 to 90%. Controlled rectifiers 52, 54 are turned off by the network including commutating capacitor 66 and controlled rectifier 50. When controlled rectifier 50 is triggered on by the multivibrator output, capacitor 66, which has been previously charged during the conduction of controlled rectifiers 52, 54, becomes discharged to reverse bias turn controlled rectifiers 52, 54 off. In a like manner, when controlled rectifiers 52, 54 are triggered on by the multivibrator output, controlled rectifier 50 will be turned off. The machining pulse on-time is thus determined during the period when controlled rectifiers 52, 54 are in their non-conductive state. Conversely, the machining pulse off-time is controlled when controlled rectifiers 52, 54 are in their conductive state. Turn-off of the gap between pulses is provided by the sharp voltage spike provided when controlled rectifiers 52, 54 are triggered into conduction. This voltage drop is well below the zero gap voltage level to insure turn-off.

Figure 3:
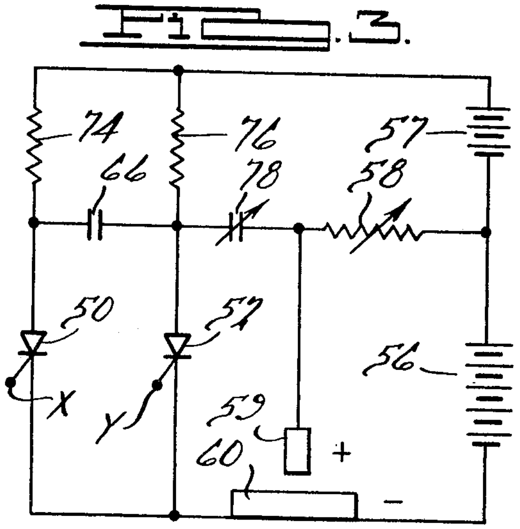
FIG. 3 is a schematic of an alternate form of my invention.

The circuit of FIG. 3 has some similarity to that of FIG. 2. A pair of controlled rectifiers 50, 52 are employed which are alternately triggered on by the multivibrator output pulses at gating electrode terminals X, Y. A commutating capacitor 66 is employed for turn-off of the controlled rectifiers. It will be seen that controlled rectifier 52 is coupled across the machining gap through a second capacitor 78 which capacitor is of substantially higher magnitude than capacitor 66. A second power supply 57 is connected in the circuit as shown with resistors 74, 76. Resistor 74 is of a relatively higher magnitude than resistor 76 to provide for maximum operating efficiency.

The operation of the FIG. 3 circuit provides high current machining at machining pulse on-time as high as 99% at certain frequencies. Polarity of the electrode 59 relative to workpiece 60 is positive to provide for graphite electrode no-wear cutting. The cutting operation is initiated by turn-on of one of the controlled rectifiers 50 or 52 by the multivibrator. If either controlled rectifier is turned on, it remains conducting until turned off by the operation of the other. To provide for this turn-off operation, both resistors 74 and 76 must be of a magnitude sufficiently low to allow sustaining current to flow in their respective parallel branches. If controlled rectifier 52 is triggered on, commutating capacitor 66 is charged through resistor 74 to the combined voltages of sources 57 and 56 less the forward voltage drop across controlled rectifier 52. The gate of controlled rectifier 50 is then triggered to render controlled rectifier 50 conductive. Controlled rectifier 50 thus shunts load current from the parallel branch. The shunting current transient with the aid of the initial charge on capacitor 66 is sufficient to turn off controlled rectifier 52. With controlled rectifier 50 in the closed state, capacitor 66 charges through resistor 76 to a voltage determined by that of source 57 plus source 56 less the drop across controlled rectifier 50. At the same time capacitor 78 will be charged through resistor 76 to the voltage magnitude of sources 56 and 57 to a voltage level above that of the machining gap. As has previously been indicated, capacitor 78 is of relatively large magnitude. When controlled rectifier 50 next is turned off, capacitor 78 will be discharged into the machining gap to turn it off for a period of 5–20 microseconds. The turn-off voltage spike provided to the gap is of the order of 10–20 volts below the zero voltage level to insure gap turn-off for a period which represents machining pulse off-time. With this mode of operation, the duty factor of machining pulses provided may be as high as 99%.

It will thus be seen that by my invention I have provided a new and improved power supply circuit for electrical discharge machining.

I claim:

1. In an electrical discharge machining apparatus for machining a conductive workpiece by a tool electrode across a dielectric coolant filled gap, a machining power circuit comprising a power source connected across said gap wherein the improvement comprises a first controlled rectifier having a gate electrode and a pair of principal electrodes, said principal electrodes operatively connected across said gap, a second controlled rectifier having a gating electrode and a pair of principal electrodes, said principal electrodes of each of said rectifiers operatively connected to said principal electrodes of the other for turning it off, and a pulsing means having an output coupled to each of said gating electrodes for alternately triggering them on.

2. The combination as set forth in claim 1 wherein a commutating capacitor is connected in series between corresponding principal electrodes of said controlled rectifiers for turn-off.

3. The combination as set forth in claim 2 wherein an inductor is connected between said source and one terminal of said capacitor for relatively high frequency operation.

4. The combination as set forth in claim 2 wherein an inductor and a first diode are series connected between said source and one terminal of said capacitor and wherein a second diode oppositely phased from said first diode is connected in shunt with said inductor.

5. In an electrical discharge machining apparatus for machining a conductive workpiece by a tool electrode across a dielectric coolant filled gap, a machining power circuit comprising a power source connected across said gap to render said electrode positive and said workpiece negative, wherein the improvement comprises a first controlled rectifier having a gating electrode and a pair of principal electrodes, said principal electrodes connected in series with a current limiting resistor between said electrode and said workpiece in like phasing with said power source, a second controlled rectifier having a gating electrode and a pair of principal electrodes, said principal electrodes connected in series with a commutating capacitor across said principal electrodes of said first controlled rectifier, a charging inductor connected between one terminal of said power source and a point in common between a principal electrode of said second controlled rectifier and said capacitor, and pulsing means for alternately providing triggering pulses to the gating electrodes of said first and second controlled rectifiers.

6. The combination as set forth in claim 5 wherein said pulsing means comprises an astable multivibrator including a pair of switches cross-coupled and biased for alternate operation to provide spaced variable on-off time pulses to said controlled rectifiers.

7. In an electrical discharge machining apparatus for machining a conductive workpiece by a tool electrode across a dielectric coolant filled gap, a machining power circuit comprising a first power source operatively connected across said gap, wherein the improvement comprises a first controlled rectifier having a gate electrode and a pair of principal electrodes, said principal electrodes connected in series with a capacitor across said gap, a second controlled rectifier having a gate electrode and a pair of principal electrodes, said principal electrodes connected in series with a commutating capacitor across said principal electrodes of said first controlled rectifier, a second voltage source in series with said first voltage source, a pair of resistors, each of said resistors connected between a common terminal of said second source and a different terminal of said commutating capacitor, and a pulsing means operatively connected to the gate electrode of each of said controlled rectifiers for alternately turning them on.

8. The combination as set forth in claim 7 wherein said second voltage source is of substantially lower magnitude than said first voltage source and wherein said resistor in series with said second controlled rectifier is of a substantially higher magnitude than said other resistor to provide high efficiency of operation.

9. In an electrical discharge machining apparatus for machining a conductive workpiece by a tool electrode across a dielectric coolant filled gap, a machining power circuit comprising a power source connected in series with a resistor across said gap, a first controlled rectifier having a gate electrode and a pair of principal electrodes, a capacitor connected in series with said principal electrodes across said gap, a second controlled rectifier having a gate electrode and a pair of principal electrodes, a commutating capacitor connected in series with said principal electrodes across said principal electrodes of said first controlled rectifier, a second power source, means connecting said power source to either terminal of said commutating capacitor, and a pulsing means operatively connected to the gate electrodes of said controlled rectifiers for alternately triggering them on.

10. In an electrical discharge machining apparatus for machining a conductive workpiece by a tool electrode across a dielectric coolant filled gap, a machining power circuit comprising a power source connected in series with a resistor across said gap wherein the improvement comprises a first controlled rectifier having a gate electrode and a pair of principal electrodes, a first capacitor connected in series with said principal electrodes across said gap and in series with said resistor, a second controlled rectifier having a gate electrode and a pair of principal electrodes, a commutating capacitor connected in series with said principal electrodes of said second controlled rectifier across said principal electrodes of said first controlled rectifier and in series with said first capacitor, a second voltage source, a pair of different magnitude resistors each connected in series between a common terminal of said second source and a different terminal of said commutating capacitor, said first capacitor of substantially greater magnitude than said commutating capacitor, and pulsing means for providing alternate triggering pulses to each of said gate electrodes.

11. In an electrical discharge machining apparatus for machining a conductive workpiece by a tool electrode across a dielectric coolant filled gap, a machining power circuit comprising a power source connected across said gap, wherein the improvement comprises a first controlled rectifier having a gate electrode and a pair of principal electrodes, a first inductor connected in series with said principal electrodes across said gap, a second controlled rectifier having a gate electrode and a pair of principal electrodes, a commutating capacitor connected in series combination with said principal electrodes across said principal electrodes of said first controlled rectifier, said commutating capacitor in series with said first inductor, a second inductor connected between said source and a point in common between a principal electrode of said second controlled rectifier and said capacitor, and pulsing means for providing alternate triggering pulses to the gate electrodes of said first and second controlled rectifiers.

12. In an electrical discharge machining apparatus for machining a conductive workpiece by a tool electrode across a dielectric coolant filled gap, a machining power circuit comprising a power source operatively connected across said gap, wherein the improvement comprises a first controlled rectifier having a gate electrode and a pair of principal electrodes, said principal electrodes connected in series with a capacitor across said gap, a second controlled rectifier having a gate electrode and a pair of principal electrodes, said principal electrodes connected in series with a commutating capacitor across said principal electrodes of said first controlled rectifier, a pair of resistors, each of said resistors connected between a common terminal of said source and a different terminal of said commutating capacitor, and a pulsing means operatively connected to the gate electrode of each of said controlled rectifiers for alternately turning them on.

References Cited

UNITED STATES PATENTS 3,056,065 9/1962 Porterfield.

OTHER REFERENCES

Page 392, GE Transistor Manual, 7th Ed. (1964) General Electric Co., Syracuse, N.Y.

JOSEPH V. TRUHE, Primary Examiner

R. F. STAUBLY, Assistant Examiner